(12) United States Patent
Baseri et al.

(10) Patent No.: US 12,021,365 B2
(45) Date of Patent: Jun. 25, 2024

(54) LAMINATED BUSBAR HAVING A SHIELD LAYER FOR BATTERY SYSTEMS

(71) Applicant: Rivian IP Holdings, LLC, Plymouth, MI (US)

(72) Inventors: Ehsan Baseri, Irvine, CA (US); Kyle Butterfield, Rancho Santa Margarita, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 0 days.

(21) Appl. No.: 18/117,537

(22) Filed: Mar. 6, 2023

(65) Prior Publication Data

US 2023/0318277 A1 Oct. 5, 2023

Related U.S. Application Data

(63) Continuation of application No. 17/034,322, filed on Sep. 28, 2020, now Pat. No. 11,600,979.

(51) Int. Cl.
*H02G 5/00* (2006.01)
*H01M 50/502* (2021.01)

(52) U.S. Cl.
CPC .......... *H02G 5/005* (2013.01); *H01M 50/502* (2021.01); *H01M 2220/20* (2013.01)

(58) Field of Classification Search
None
See application file for complete search history.

(56) References Cited

U.S. PATENT DOCUMENTS

| 10,910,800 | B1* | 2/2021 | Baseri | H02B 1/20 |
| 2008/0196924 | A1* | 8/2008 | Beulque | H02G 5/005 |
| | | | | 174/117 A |
| 2017/0244139 | A1* | 8/2017 | Tononishi | H01G 9/0029 |
| 2017/0358897 | A1* | 12/2017 | Young | H05K 7/20927 |
| 2018/0049310 | A1* | 2/2018 | Schneider | H01R 12/526 |
| 2018/0098449 | A1* | 4/2018 | Jaskari | H02G 5/02 |
| 2018/0261992 | A1* | 9/2018 | Bower | H01M 50/512 |
| 2018/0294530 | A1 | 10/2018 | de Souza et al. | |
| 2019/0296269 | A1* | 9/2019 | Monismith | H01M 50/193 |

(Continued)

FOREIGN PATENT DOCUMENTS

| CN | 104143926 A | 11/2014 |
| CN | 107104211 A | 8/2017 |

(Continued)

*Primary Examiner* — Scott J. Chmielecki
(74) *Attorney, Agent, or Firm* — Haley Guiliano LLP

(57) ABSTRACT

A laminated busbar assembly includes one or more busbars that are configured to be electrically coupled to a plurality of battery cells, one or more insulative layers arranged adjacent to the one or more busbars, and a steel layer arranged between the one or more busbars and the plurality of battery cells. The steel layer is configured to shield the one or more busbars from a thermal event associated with one or more battery cells of the plurality of battery cells. The thermal event may include a debris, hot gas, sparks, embers, or other emanations. Each of the battery cells each include a respective venting end, where electrical terminals are located, that face the steel layer. The laminated busbar is a stack of layers that can include two busbars that form a DC bus, with insulation arranged between the busbars and between the steel layer and the proximal busbar.

20 Claims, 6 Drawing Sheets

(56) References Cited

U.S. PATENT DOCUMENTS

| | | | |
|---|---|---|---|
| 2019/0296274 A1* | 9/2019 | Tang | B60L 58/26 |
| 2019/0296296 A1* | 9/2019 | Tang | H01M 50/103 |
| 2019/0296405 A1* | 9/2019 | Tang | H01M 50/569 |
| 2020/0152955 A1* | 5/2020 | Monismith | H01M 50/579 |
| 2020/0153219 A1 | 5/2020 | Baseri et al. | |
| 2020/0168858 A1* | 5/2020 | Monismith | H01M 50/159 |
| 2020/0168964 A1* | 5/2020 | Monismith | B60L 58/26 |
| 2020/0203941 A1* | 6/2020 | Ing | H05K 1/118 |
| 2020/0212432 A1* | 7/2020 | Yang | H01M 4/0404 |
| 2020/0274307 A1* | 8/2020 | Young | H01L 23/492 |
| 2021/0046581 A1 | 2/2021 | Tang et al. | |
| 2021/0078446 A1* | 3/2021 | Wang | H02G 5/005 |
| 2021/0319933 A1* | 10/2021 | Beaupre | H01B 7/426 |
| 2022/0102954 A1* | 3/2022 | Baseri | H01M 50/526 |
| 2022/0158295 A1* | 5/2022 | Kotik | H01M 10/6567 |

FOREIGN PATENT DOCUMENTS

| | | |
|---|---|---|
| CN | 107624216 A | 1/2018 |
| JP | S52-066992 U | 5/1977 |
| JP | 2004127554 A | 4/2004 |
| JP | 2004265610 A | 9/2004 |
| JP | 2016054127 A | 4/2016 |
| JP | 2016072041 A | 5/2016 |
| JP | 2017059501 A | 3/2017 |
| JP | 2017199534 A | 11/2017 |
| JP | 2020017396 A | 1/2020 |
| WO | 2020044275 A1 | 3/2020 |

\* cited by examiner

LAMINATED BUSBAR HAVING A SHIELD LAYER FOR BATTERY SYSTEMS

CROSS-REFERENCE TO RELATED APPLICATIONS

This application is a continuation of U.S. patent application Ser. No. 17/034,322, filed Sep. 28, 2020, the disclosure of which is hereby incorporated by reference herein in its entirety.

INTRODUCTION

The present disclosure is directed to a laminated busbar for a battery system, and more particularly, to a busbar having a shield layer to protect against thermal events.

SUMMARY

In some embodiments, the present disclosure is directed to a laminated busbar assembly that includes at least one busbar, an insulative layer, and a steel layer. The at least one busbar is configured to be electrically coupled to a plurality of battery cells. The insulative layer is arranged adjacent to the at least one busbar and is dielectric. The steel layer is arranged adjacent to the insulative layer and arranged between the at least one busbar and the plurality of battery cells. The steel layer is configured to shield the at least one busbar from a thermal event associated with one or more battery cells of the plurality of battery cells. The plurality of battery cells each include a respective venting end facing the steel layer.

In some embodiments, the at least one busbar includes an aluminum material, a copper material, any other suitable conductive material, or any combination thereof.

In some embodiments, a portion of the steel layer is separated from the insulative layer by an airgap. In some embodiments, the laminated busbar assembly includes one or more standoffs made of a dielectric material, that extend through the airgap.

In some embodiments, the laminated busbar assembly is configured to be installed as a single workpiece. For example, the laminated busbar assembly may be handled as a single component.

In some embodiments, the at least one busbar includes a first busbar and a second busbar, the insulative layer is arranged between the second busbar and the steel layer, and the laminated busbar assembly includes a second insulative layer arranged the first busbar and a first side of the second busbar.

In some embodiments, the present disclosure is directed to a battery system that includes a first plurality of battery cells arranged in a first battery module, a second plurality of battery cells arranged in a second battery module, and a laminated busbar assembly arranged configured to be electrically coupled to the first plurality of battery cells and to the second plurality of battery cells. The first plurality of battery cells and the second plurality of battery cells each include a respective venting end. For example, the electrical terminals may be arranged concentrically at the venting end, with a region between the terminals configured as a vent. The first battery module and the second battery module are arranged next to each other and are electrically coupled in series. The laminated busbar assembly is arranged over a first portion of the first battery module facing the respective venting ends. The laminated busbar includes a first busbar configured to be electrically coupled to the first plurality of battery cells and to the second plurality of battery cells, a second busbar configured to be electrically coupled to the first plurality of battery cells and to the second plurality of battery cells, a first insulative layer arranged between the first busbar and the second busbar, a second insulative layer arranged adjacent to the second busbar, and a steel layer arranged adjacent to second layer and arranged between the second busbar and the plurality of battery cells. The steel layer is configured to shield the first busbar and the second busbar from a thermal event associated with one or more battery cells of the first plurality of battery cells. In some embodiments, a laminated busbar assembly is installed as a single workpiece in a battery system.

In some embodiments, the steel layer is configured to be electrically grounded.

In some embodiments, the laminated busbar includes a third insulative layer arranged adjacent to the first busbar opposite from the first insulative layer.

In some embodiments, the present disclosure is directed to a battery system that includes a plurality battery modules, each including a respective plurality of battery cells, and a laminated busbar assembly. The battery modules are electrically coupled by a plurality of busbars, and each battery cell includes a respective venting end. The laminated busbar assembly includes at least one busbar of the plurality of busbars. The laminated busbar assembly is configured to be electrically coupled to the first plurality of battery cells and to the second plurality of battery cells. The at least one busbar is arranged over a first portion of the first battery module. The laminated busbar assembly also includes an insulative layer arranged adjacent to the at least one busbar, and a steel layer arranged adjacent to the at least one insulative layer and arranged between the at least one busbar and the plurality of battery cells. The steel layer is configured to shield the at least one busbar from a thermal event associated with one or more battery modules of the plurality of battery modules.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

In some embodiments, a battery system includes one or more battery modules that each include a plurality of battery cells. Subsets of the battery cells are electrically connected in parallel, and the subsets are electrically connected in series by a series of current collectors (or busbars). For example, terminal current collectors, or busbars, exhibit an electric potential difference that defines a DC bus. In some embodiments, switching components, fuse components, busbars carrying the full voltage of the battery module, any other suitable power electronics, any other suitable components, or any combination thereof may be arranged on or near the battery module(s). In some embodiments, a laminated busbar is arranged on a side (e.g., the front, back, or any lateral surface) of the battery system for making suitable electrical connections between the components. In some such embodiments, the laminated busbar extends over a portion of a battery module, and thus may be arranged over one or more battery cells (e.g., venting ends of the battery cells). For example, if a battery cell undergoes a thermal event, the nearby busbar may be damaged. Accordingly, it may be desirable to provide a laminated busbar arranged over a battery module, which is shielded from the battery cells.

In an illustrative example, a cylindrical battery cell may include a jacket (e.g., steel) that covers a first axial end and the cylindrical side (e.g., the lateral side) of the battery cell. The jacket ends at a rim at the second axial end of the battery cell. The second axial end also typically has a button electrode and a vent structure between the jacket rim and the button electrode (e.g., both positive and negative electrodes are arranged at the second axial end, in a concentric pattern). When a battery cell overheats or otherwise undergoes a thermal event, gas, grit, flame, sparks, or a combination thereof may escape through the venting structure. Components facing the venting end of a battery cell can therefore be damaged during a thermal event.

In some embodiments, the present disclosure is directed to a laminated busbar having a steel layer (e.g., an outer layer). For example, the steel layer may be positioned on a side of the laminated busbar facing the battery module (e.g., nearest the battery cells). In some embodiments, the steel layer is configured and arranged to provide thermal protection for the laminated busbar in the event a battery cell arranged under the laminated busbar undergoes a thermal event.

Figure 1:
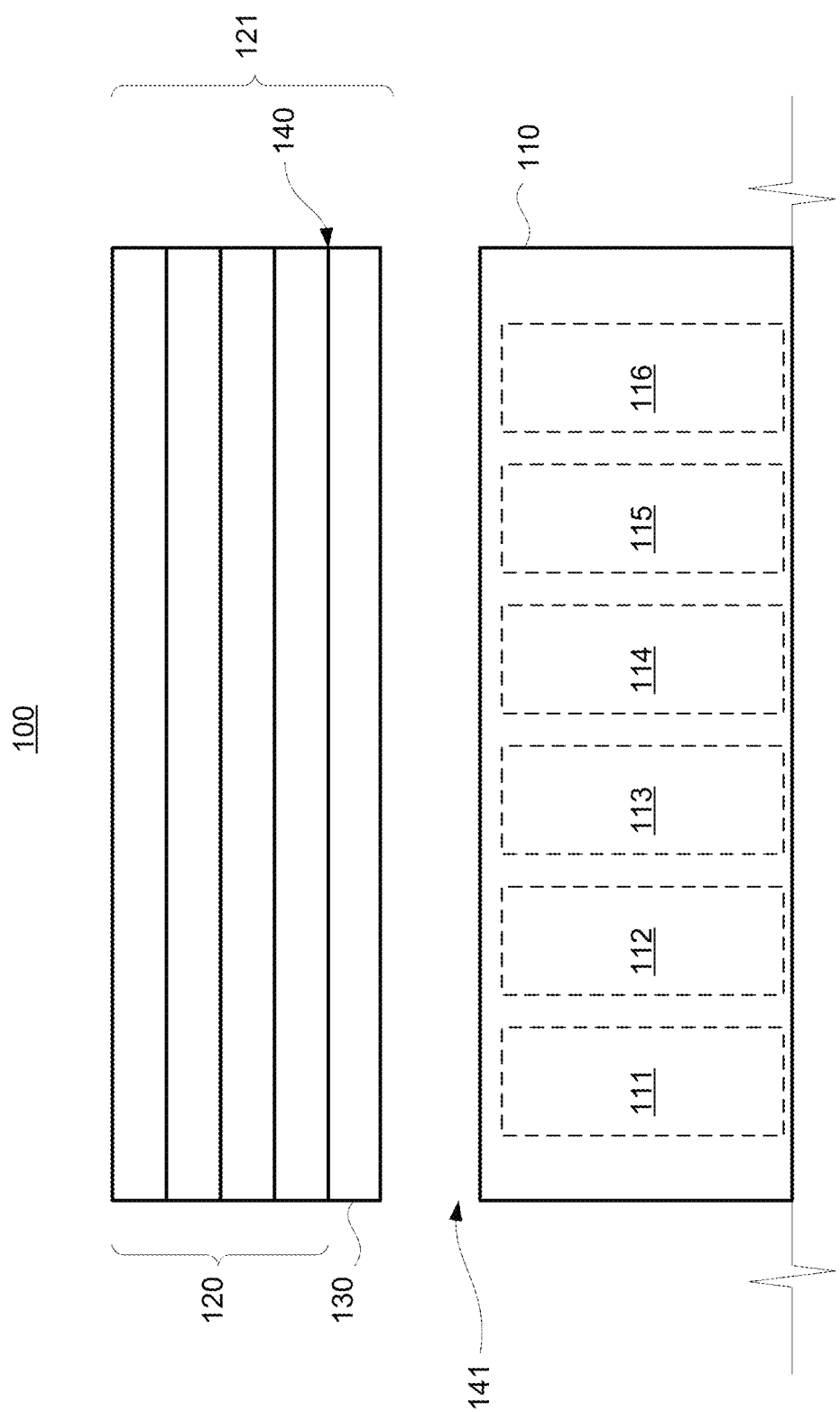
FIG. 1 shows a cross-sectional front view of an illustrative battery system having a laminated busbar assembly that includes a shield layer, in accordance with some embodiments of the present disclosure.

FIG. 1 shows a cross-sectional front view of a portion of illustrative battery system 100 having laminated busbar assembly 121 that includes shield layer 130, in accordance with some embodiments of the present disclosure. Battery system 100 includes battery module 110 and laminated busbar assembly 121. Laminated busbar assembly 121 includes busbar stack 120 and shield layer 130, and interface 140 that may, but need not, include a space (e.g., an airgap). Shield layer 130 of laminated busbar assembly 121 and battery module 110, as illustrated, are separated by space 141. Battery module 110 includes battery cells 111, 112, 113, 114, 115, and 116 (e.g., which may represent a subset of battery cells of battery module 110). As illustrated, each of battery cells 111-116 may include a cylindrical battery cell with both a positive terminal and negative terminal arranged at the top end (e.g., towards laminated busbar assembly 121, as illustrated). Laminated busbar assembly 121 may be configured to be installed as a single workpiece. For example, shield layer 130, and busbar stack 120 may be adhered or otherwise bonded to each other to form a stack of layers that may be installed in battery system 100 as a unit.

As illustrated, busbar stack 120 includes several layers. For example, layers of busbar stack 120 may include a busbar (e.g., an electrically conductive element for distributing or collecting current from a plurality of battery cells), an insulative layer (e.g., a dielectric material), or any combination thereof. For example, one or more layers of busbar stack 120 may include electrically conductive material (e.g., copper, aluminum, carbon fiber), while one or more other layers may include electronically insulative material to provide electrical insulation between the conductive layers or portions of busbar stack 120.

In some embodiments, for example, shield layer 130 includes a steel layer (e.g., a plate or a sheet). In some embodiments, an intermediate layer (e.g., interface 140 as illustrated) is positioned between shield layer 130 and busbar stack 120. Layer 140 may include, for example, an air gap, standoff, thermal insulator, any other suitable component or material, or any combination thereof. In some embodiments, for example, the intermediate layer includes a combination of an air gap and a standoff. In some embodiments, the intermediate layer includes a thermal insulator layer such as, for example, a dielectric sheet. In some embodiments, the thickness and properties of layer interface 140 and shield layer 130 are sufficient to provide thermal protection from a battery cell thermal event (e.g., from one or more of battery cells 111-116). For example, interface 140 may include an adjacent interface wherein shield layer 130 is adjacent to busbar stack 120. In a further example, interface 140 may include a gapped interface wherein shield layer 130 is spaced off from laminated busbar 120 (e.g., with insulation, an airgap, standoffs, or a combination thereof arranged there between). In some embodiments, for example, interface 140 may be approximately 0.5 mm thick. In some embodiments, for example when the battery system is configured for an electric vehicle, shield layer 130 may be grounded to a vehicle ground.

To illustrate, battery system 100 may enable the arrangement of laminated busbar assembly 121 above battery module 110. In some embodiments, shield layer 130 is configured to provide thermal protection to busbar stack 120 without requiring separate components or additional spacing between components. In some embodiments, shield layer 130 may be included as part of busbar stack 120, assembled using any suitable manufacturing process (e.g., to reduce assembly time for assembling battery system 100). In some embodiments, battery system 100 provides a thermally protected busbar in a minimum packaging height (e.g., to increase packaging density).

Space 141 may include any suitable thickness, and intervening material between laminated busbar assembly 121 and battery module 110. For example, space 141 may include an airgap, an insulating layer (e.g., thermal insulation, electrical insulation, or both), one or more standoffs, any other suitable gap or layer, or any combination thereof. To illustrate, in some embodiments, laminated busbar assembly 121 is assembled and then installed as a unit over battery module 110. To further illustrate, in some embodiments, battery module 110, laminated busbar assembly 121, or both may include electrical insulation in at least a portion of space 141 (e.g., arranged over current carriers, grounded components, or other potential electrical shorting locations).

To illustrate, a laminated busbar assembly (e.g., laminated busbar assembly 121) may include multiple layers of electrical conductors and dielectrics, arranged to provide routing for electrical current and isolation among busbars and from other components. The layers may be adhered (e.g., with any suitable adhesive having any suitable electrical properties), pressed (e.g., to a specified pressure or thickness), processed (e.g., heated, chemically treated, trimmed), or otherwise combined to form a laminated busbar assembly that may be handled as a single component. A laminated busbar assembly may provide a structurally rigid, contoured, and compact component for routing and isolating current carrying members (e.g., busbars). For example, to illustrate, because a laminated busbar assembly may be substantially planar (e.g., flat with a relatively small thickness relative to in-plane dimensions), and may be shaped to fit available space in a battery system, the assembly may be more easily installed to maintain a compact design.

To further illustrate, a laminated busbar assembly (e.g., laminated busbar assembly 121) may include multiple layers of electronic conductors that are isolated from each other by layers of dielectric materials such as, for example, polyimide (PI) and polyethylene terephthalate (PET) in between each layer. The conductive and dielectric layers may be arranged, pressed, and baked at high temperature, resulting in the integrated, laminated assembly.

Figure 2:
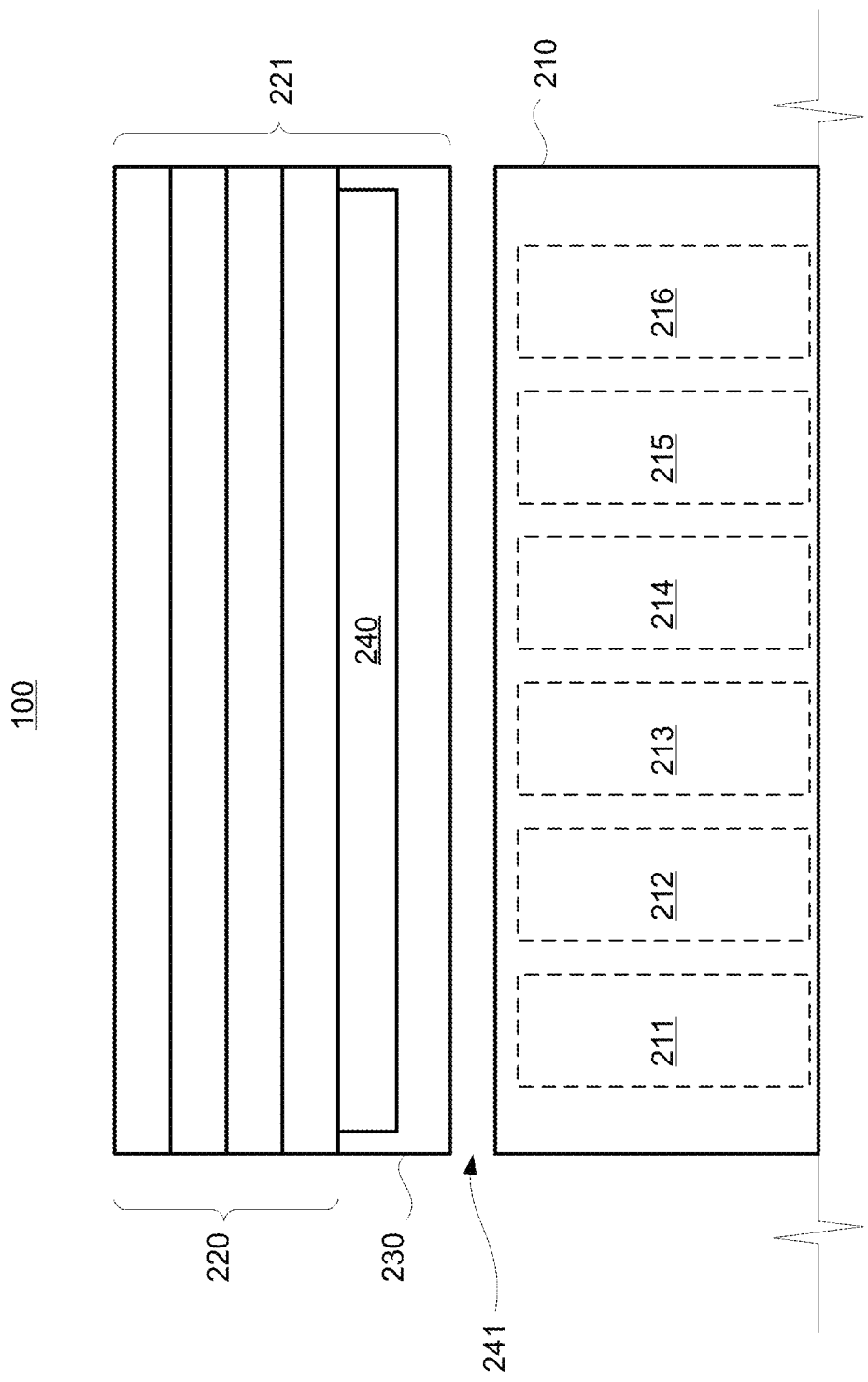
FIG. 2 shows a cross-sectional front view of an illustrative battery system having a laminated busbar assembly, in accordance with some embodiments of the present disclosure.

FIG. 2 shows a cross-sectional front view of illustrative battery system 200 having a laminated busbar assembly 221, in accordance with some embodiments of the present disclosure. Battery system 200 includes battery module 210 and busbar assembly 221, which includes busbar stack 220 and shield layer 230. As illustrated, busbar stack 220 and shield layer 230 are integrated as laminated busbar assembly 221, and are separated by layer 240. Laminated busbar assembly 221 and battery module 210, as illustrated, are separated by space 241. Battery module 210 includes battery cells 211, 212, 213, 214, 215, and 216 (e.g., which may represent a subset of battery cells of battery module 210). For example, battery module 210 may be similar to battery module 110 of FIG. 1. In a further example, busbar stack 220 may be similar to busbar stack 120 of FIG. 1. Laminated busbar assembly 221 may be configured to be installed as a single workpiece. For example, shield layer 230, and busbar stack 220 may be adhered or otherwise bonded to each other to form a stack of layers that may be installed in battery system 200 as a unit.

As illustrated, busbar stack 220 includes several layers such as, for example, one or more busbars (e.g., an electrically conductive elements for distributing or colleting current from a plurality of battery cells), one or more insulative layers (e.g., of a dielectric material), or any combination thereof. To illustrate, laminated busbar assembly 221 may include two busbars, defining an electrical DC bus, separated by a dielectric layer, and insulated by further dielectric layer(s) from shield layer 230 and any other suitable components.

In some embodiments, for example, shield layer 230 includes a steel tray configured as part of laminated busbar 221 (e.g., be affixed to busbar stack 220). In some embodiments, an intermediate layer (e.g., layer 240 as illustrated) is formed between shield layer 230 and busbar stack 220. Layer 240 may include, for example, an air gap, standoff, thermal insulator, any other suitable component or material, or any combination thereof. In some embodiments, for example, the intermediate layer may include a combination of an air gap and a standoff. In some embodiments, the thickness and properties of layer 240 and shield layer 230 are sufficient to provide thermal protection from a battery cell thermal event (e.g., from one or more of battery cells 211-216). In some embodiments, for example, layer 240 may be approximately 0.5 mm thick. To illustrate, layer 240 is formed by standoff regions of shield layer 230 that extend away from busbar stack 220 (e.g., standoffs 231 and 232 may be integrated into or separate components from shield layer 230). In some embodiments, for example when the battery system is configured for an electric vehicle, shield layer 230 may be grounded to a vehicle ground. Shield layer 230 may include any suitable material, having any suitable thickness and shape, and arranged any suitable distance (e.g., adjacent to or spaced from) from battery module 210.

Figure 3:
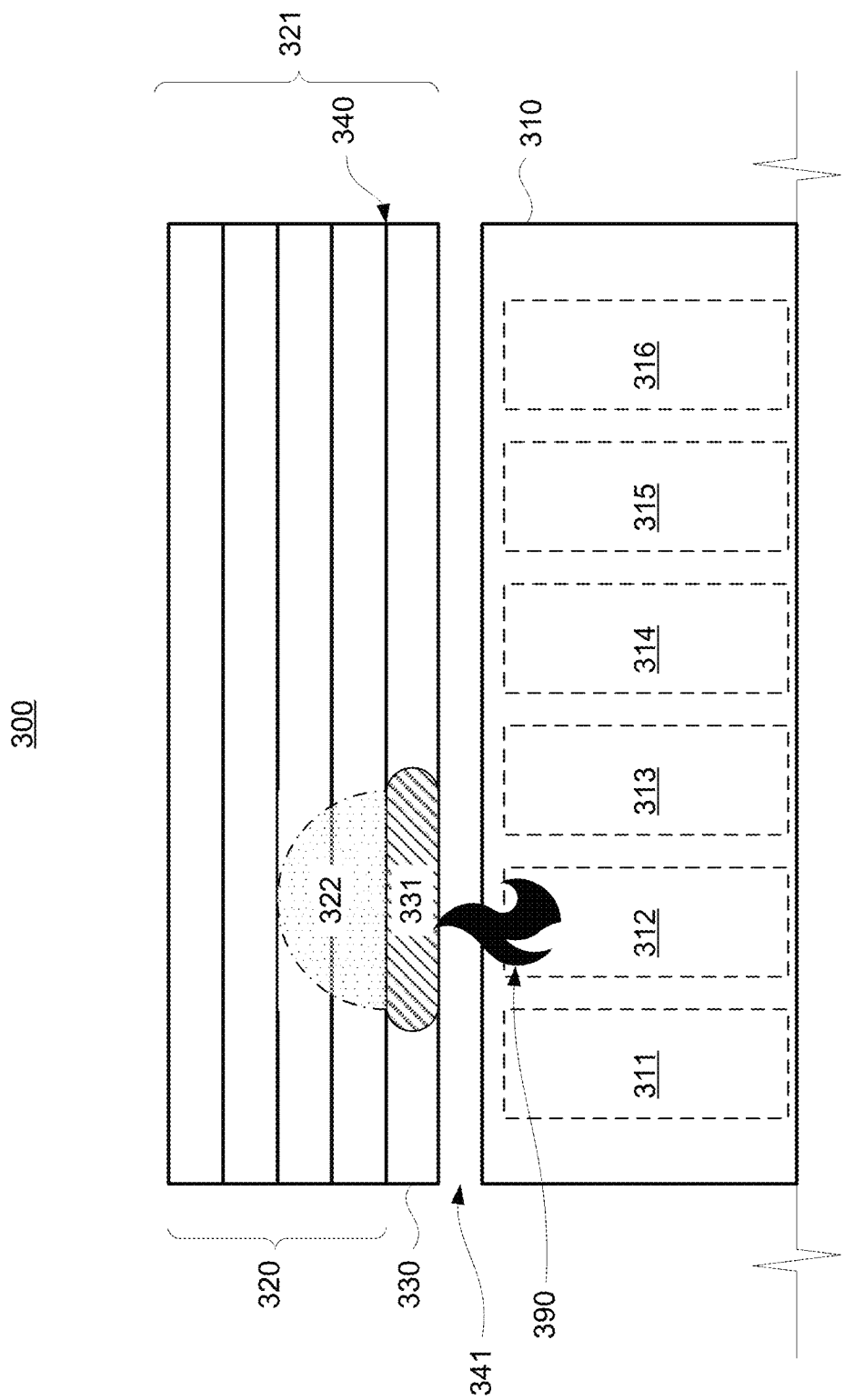
FIG. 3 shows a cross-sectional front view of an illustrative battery system undergoing a thermal event, in accordance with some embodiments of the present disclosure.

FIG. 3 shows a cross-sectional front view of illustrative battery system 300 undergoing thermal event 390, in accordance with some embodiments of the present disclosure. Battery system 300 includes battery module 310 and laminated busbar assembly 321, which includes busbar stack 320 and shield layer 330. As illustrated, busbar stack 320 and shield layer 330 meet at interface 340. Battery module 310 includes battery cells 311, 312, 313, 314, 315, and 316 (e.g., which may represent a subset of battery cells of battery module 310). For example, battery module 310 may be similar to battery module 110 of FIG. 1, busbar stack 320 may be similar to busbar stack 120 of FIG. 1, and shield layer 330 may be similar to shield layer 130 of FIG. 1. Shield layer 330 may protect busbar stack 320 from sparks (e.g., ionized gas species), embers, debris, hot jets, hot gas, radiation heat transfer, convective heat transfer, or a combination thereof. Interface 340, which may include insulation, an airgap, standoffs, or a suitable combination thereof, may provide additional shielding for busbar stack 320 from convective heat transfer, conductive heat transfer, or a combination thereof. Laminated busbar assembly 321 is separated from battery module 310 by space 341. Space 341 may include a contact interface (e.g., no separation), an airgap, a standoff, or a combination thereof.

In some circumstances, one or more battery cells may experience a thermal event. For example, during operation, a battery cell may undergo venting, fire, thermal runaway, overheating, arcing (e.g., generating sparks or plasma), electrical shorting, any other failure mode that may generate a damaging environment for a busbar, or any combination thereof. As illustrated in FIG. 3, battery cell 312 is undergoing thermal event 390, which raises the local temperature. For example, region 331 of shield layer 330 is heating due to thermal event 390, and thus may be at a greater temperature than the rest of shield layer 330. As heat is transferred to shield layer 330, and conducted throughout shield layer 330, the temperature field near and within busbar stack 320 may be relatively less than if shield layer 330 were not present. For example, region 322 of busbar stack 320 may experience some temperature rise due to thermal event 390.

However, the temperature rise of region 322 (e.g., as compared to the rest of busbar stack 320) may be reduced as compared to the configuration without shield layer 330. In a further example, region 322 may experience a lower temperature, lower temperature rise, or both, than region 331 of shield layer 330. Achieving a lower temperature, lower temperature rise, or both, of laminated busbar 320 during operation may allow longer life, reduced chance of failure, better operation, more compact design, or a combination thereof. To illustrate, because artifacts and aspects (e.g., hot gas, sparks, impinging gas jets, debris, irradiance) of thermal event 390 cannot directly impact busbar stack 320, busbar stack 320 is thus shielded from thermal event 390 and may operate as desired during thermal event 390 (e.g., continuously, or for a sufficient period to allow shutdown or fault management).

In a further example, the presence of shield layer 330 may block or otherwise mitigate debris caused by thermal event 390 from significantly affecting busbar stack 320. For example, an explosion or other energetic aspect of thermal event 390 may cause shrapnel, dust, particulate, plasma, embers, sparks, or other emanation to be ejected to the surrounding portions of battery system 300. In some such circumstances, shield layer 330 blocks the emanations from reaching laminated busbar 320, slows the emanations prior to reaching busbar stack 320, cools the emanations prior to reaching busbar stack 320, or otherwise reduces the effects of the emanations on busbar stack 320 as compared to a configuration without shield layer 330. To illustrate, wherein shield layer 330 includes steel grounded to a frame, emanations from thermal event may be cooled, extinguished, physically blocked, or otherwise mitigated rather than adversely impacting busbar stack 320. Because shield layer 330 need not serve other functionality, degradation in shield layer 330 due to thermal event 390 need not impair, or otherwise compromise operation of the battery system. To illustrate, shield layer 330 is relatively expendable and is not used to make electrical connections in battery system 300 but rather to protect busbar stack 320 from damage. Further, because shield layer 330 may lengthen the time that battery system 300 can operate during thermal event 390 by reducing damage to busbar stack 320, a control system or diagnostic system may be able to identify thermal event 390 and adjust operation of battery system 300 accordingly (e.g., reduce current load, perform a controlled shutdown, perform an abrupt shutdown, activate active mitigation measures, alert a user, alert a watchdog or other monitoring system, or a combination thereof).

Figure 4:
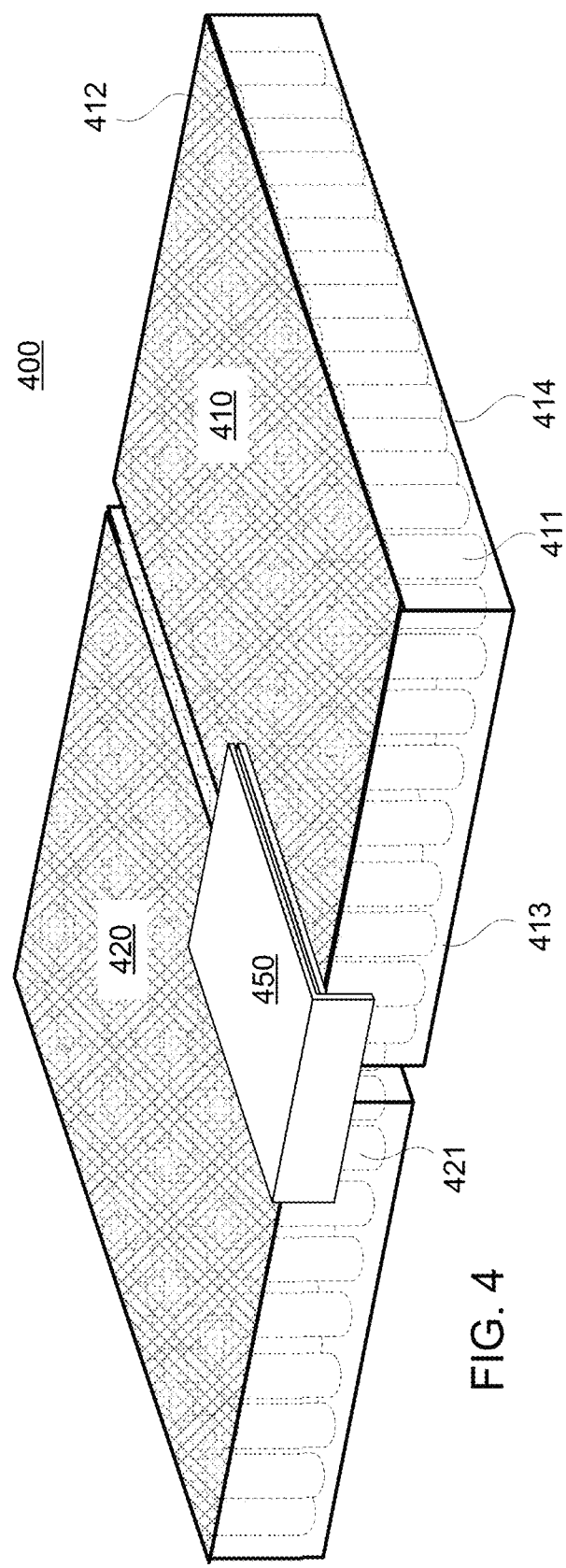
FIG. 4 shows a perspective view of an illustrative battery system having a laminated busbar assembly, in accordance with some embodiments of the present disclosure.

FIG. 4 shows a perspective view of illustrative battery system 400 having laminated busbar assembly 450, in accordance with some embodiments of the present disclosure. As illustrated, battery system 400 includes laminated busbar assembly 450, battery module 410 (e.g., including a plurality of battery cells of which battery cell 411 is one), battery module 420 (e.g., including a plurality of battery cells of which battery cell 421 is one), side walls 413 and 414, and cover 412. Laminated busbar assembly 450 may include one or more current collectors, one or more busbars (e.g., separated by electrically insulating layers), one or more insulating layers, one or more shield layers, any other suitable components, or any combination thereof. For example, laminated busbar assembly 450 may include any of the busbar assemblies, laminated busbars, and shield layers of FIGS. 1-3.

The pluralities of battery cells of each of battery modules 410 and 420 may be arranged in a plane (e.g., in an array, a pattern, or any other suitable arrangement), having subsets of battery cells electrically coupled in parallel and the subsets electrically coupled in series. For example, laminated busbar assembly 450 may include a busbar that corresponds to a terminal voltage of the pluralities of battery cells of battery modules 410 and 420, and may also include a second busbar to form a DC bus. In some embodiments (not shown), more than one laminated busbar assembly 450 may be included.

Figure 5:
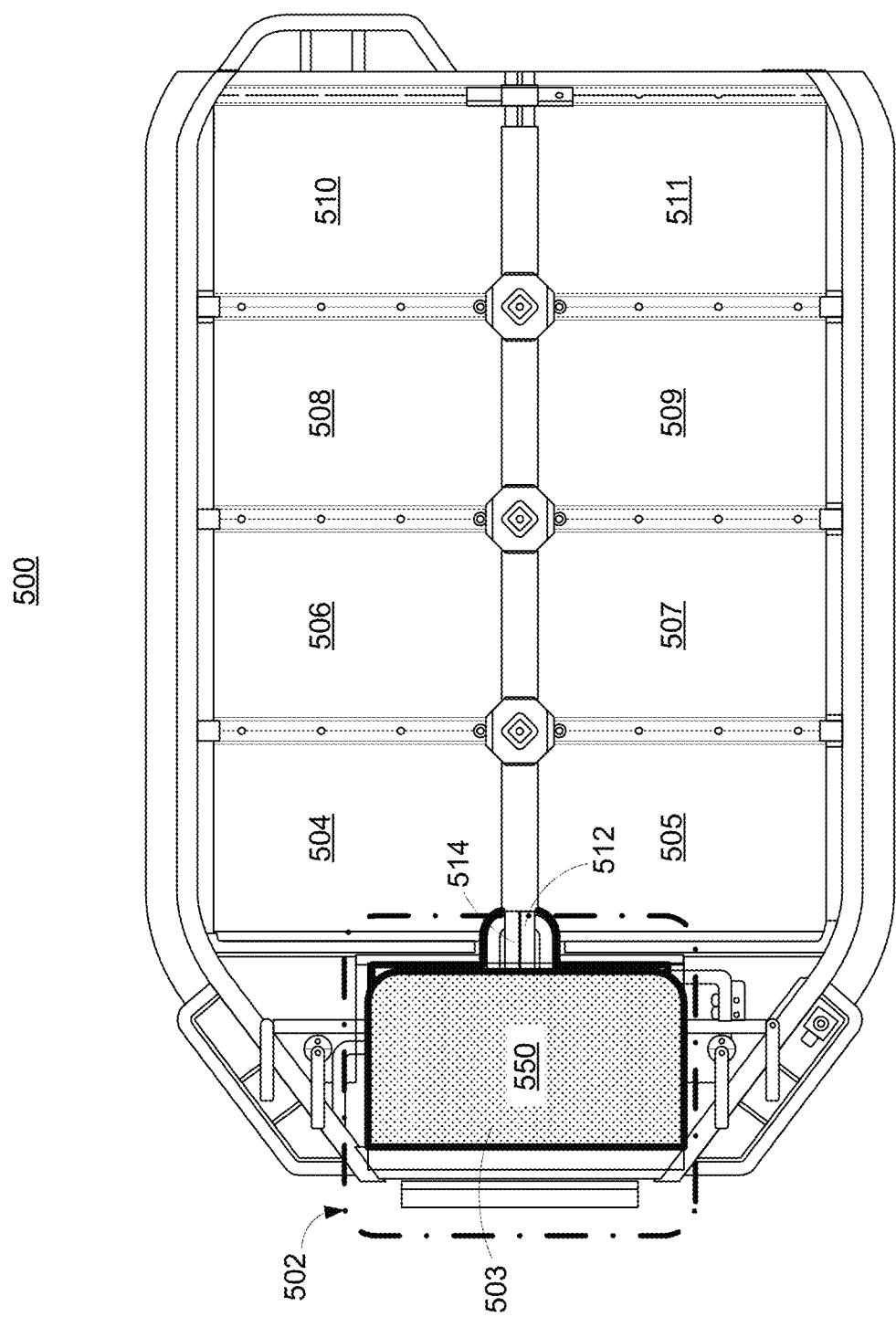
FIG. 5 shows a top view of an illustrative battery system having a plurality of battery modules, in accordance with some embodiments of the present disclosure.

FIG. 5 shows a top view of illustrative battery system 500 having a plurality of battery modules, in accordance with some embodiments of the present disclosure. Battery system 500, as illustrated, includes battery modules 503, 504, 505, 506, 507, 508, 509, 510, and 511 connected in series, a plurality of busbars (e.g., busbars 512 and 514, and laminated busbar assembly 550), and a high voltage distribution system (e.g., region 502 includes a high voltage distribution system). Laminated busbar 550 is arranged on top of battery module 503 (e.g., most of battery module 503 is not visible in FIG. 5). To illustrate, in some embodiments, an electrical potential across the most positively charged terminal of the plurality of battery modules and the most negatively charged terminal of the plurality of battery modules exceeds 300 V. In some embodiments, the most positively charged terminal and the most negatively charged terminal of the battery may be electrically coupled to a respective busbar (e.g., busbar 512 and/or busbar 514). For example, battery system 500 may include an unswitched negative terminal busbar (e.g., busbar 512) and an unswitched positive terminal busbar (e.g., busbar 514). The unswitched negative terminal busbar and the unswitched positive terminal busbar may be components of the high voltage distribution system described herein (e.g., high voltage distribution system) depicted in region 502 of battery system 500.

Although the high voltage distribution system is depicted on a leftmost side of battery system 500, at region 502, the high voltage distribution system may be located in any position of battery system 500 without departing from the scope of the present disclosure. In such embodiments, the position of the high voltage distribution system may be selected to minimize risk of electrical shorting (e.g., due a crash of the electric vehicle or due to an unswitched length of a busbar). The high voltage distribution system may include one or more contactors, fuses, current sensors, voltage sensors, temperature sensors, switches, power electronics (e.g., IGBTs), electrical hardware, any other suitable components, or any combination thereof. The high voltage distribution system may be used to route the DC bus to one or more other systems (e.g., motor drives, motors, heaters, pumps, compressors). Busbar assembly 550 is arranged near region 502 and above battery module 503 (e.g., and thus above battery cells of battery module 503). Accordingly, laminated busbar assembly 550 may include a shield layer (e.g., a steel layer) to mitigate, prevent, or otherwise lessen adverse effects from thermal events and other faults associated with battery cells. As illustrated, the shield layer is arranged at the interface between laminated busbar assembly 550 and battery module 503 (e.g., with or without an airgap).

FIGS. 6-9 show illustrative laminated busbar assemblies, in accordance with the present disclosure. A laminated busbar assembly may include any of the layers, features, configurations, and arrangements of FIGS. 6-9, in any suitable combination. To illustrate, the laminated busbar assemblies of FIGS. 6-9 may be included in high voltage distribution systems of a battery system (e.g., of an electric car).

Figure 6:
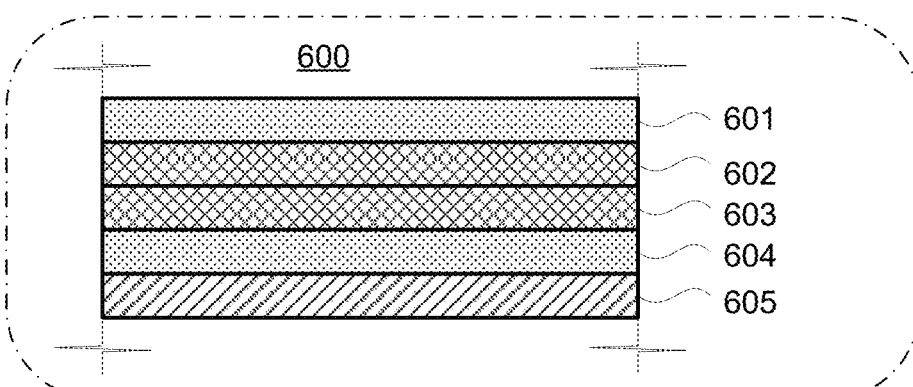
FIG. 6 shows a cross-sectional side view of an illustrative laminated busbar assembly having layers, in accordance with some embodiments of the present disclosure.

FIG. 6 shows a cross-sectional side view of illustrative laminated busbar assembly 600 having layers, in accordance with some embodiments of the present disclosure. As illustrated, laminated busbar assembly 600 includes layers 601, 602, 603, 604, and 605. Although shown as having five layers, a busbar assembly may include any suitable number of layers, components, or other suitable components having any suitable properties (e.g., electrical, mechanical, thermal).

In an illustrative example, layers 601 and 604 may include dielectric insulation layers, layer 603 may include a current collector, layer 602 may include a current collector (e.g., a busbar or terminal busbar defining a DC bus) electrically coupled to the current collector of layer 603, and layer 605 may include a shielding layer (e.g., a steel layer). In a further illustrative example, layers 601 and 604 may include dielectric insulation layers, layer 602 may include a busbar electrically coupled to a subset of battery cells, layer 604 may include an airgap (e.g., with or without standoffs), and layer 605 may be a shield layer (e.g., a steel layer).

Figure 7:
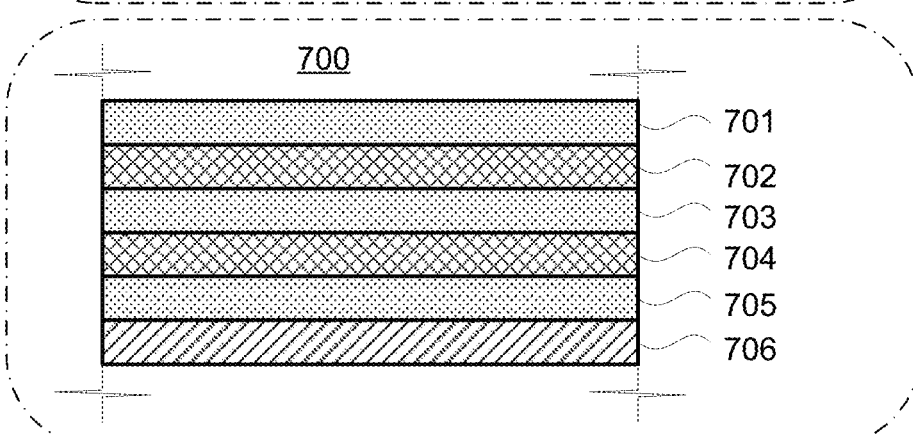
FIG. 7 shows a cross-sectional side view of an illustrative laminated busbar assembly having more than one busbar, in accordance with some embodiments of the present disclosure.

FIG. 7 shows a cross-sectional side view of illustrative laminated busbar assembly 700 having more than one busbar, in accordance with some embodiments of the present disclosure. As illustrated, laminated busbar assembly 700 includes layers 701, 702, 703, 704, 705 and 706. As illustrated, layers 701, 703, and 705 include dielectric insulation layers, layers 702 and 704 include current collectors (e.g., busbars defining a DC bus), and layer 706 includes a shield layer (e.g., a steel layer). Layers 702 and 704, for example, may each include copper busbars (or any other suitable material), that define a DC bus of a battery system (e.g., for an electric vehicle). Accordingly, layer 706 may be electrically insulated from layers 702 and 704 by layer 705, and layer 706 may provide shielding against events associated with battery cells (e.g., arranged below layer 706, as illustrated).

Figure 8:
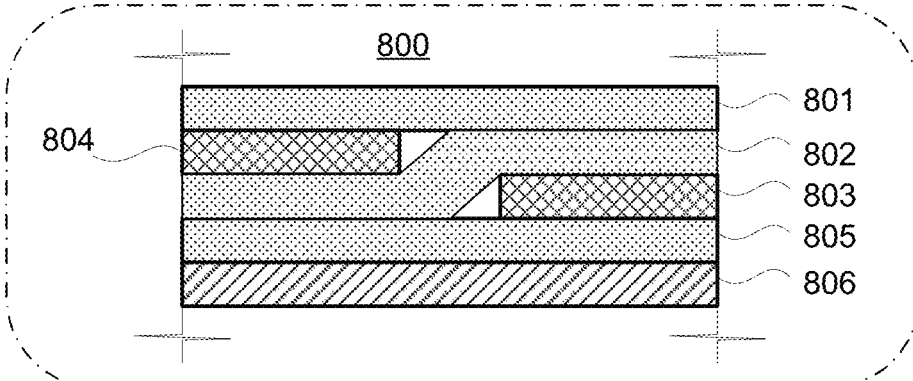
FIG. 8 shows a cross-sectional side view of another illustrative laminated busbar assembly having more than one busbar, in accordance with some embodiments of the present disclosure.

FIG. 8 shows a cross-sectional side view of illustrative laminated busbar assembly 800 having more than one busbar, in accordance with some embodiments of the present disclosure. As illustrated, laminated busbar assembly 800 includes layers 801, 802, 803, 804, 805 and 806. As illustrated, layers 801, 802, and 805 include dielectric insulation layers, layers 803 and 804 include current collectors (e.g., busbars defining a DC bus), and layer 806 includes a shield layer (e.g., a steel layer). Layers 803 and 804, for example, may each include copper busbars (or any other suitable material), that define a DC bus of a battery system (e.g., for an electric vehicle). As illustrated, layers 803 and 804 need not be arranged in a stacked configuration, and instead may be partially or fully offset. Layer 806 is electrically insulated from layers 803 and 804 by layer 805, and layer 806 may provide shielding against events associated with battery cells (e.g., arranged below layer 806, as illustrated). In some embodiments, layer 802 need not be included (e.g., layers 803 and 804 may be in the same plane but spaced apart by an airgap), or need not extend as a full layer, to provide isolation between layers 803 and 804 (e.g., layer 802 may be included only in the space or vertical interface between layers 803 and 804).

Figure 9:
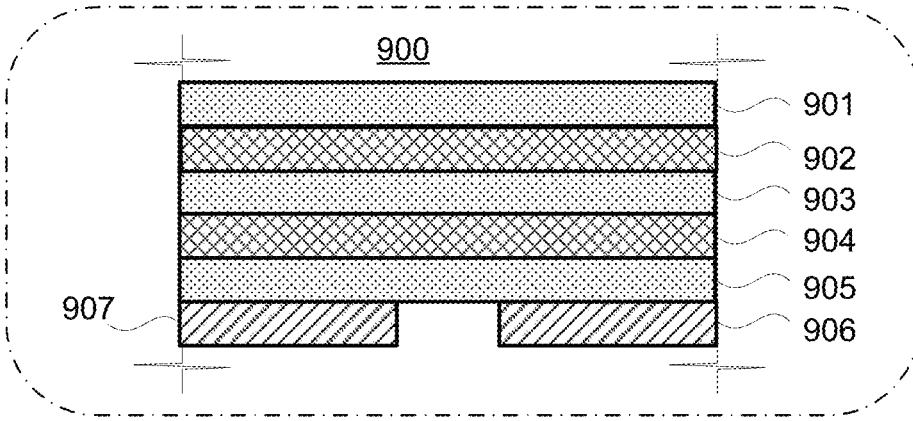
FIG. 9 shows a cross-sectional side view of another illustrative laminated busbar assembly having more than one shield, in accordance with some embodiments of the present disclosure.

FIG. 9 shows a cross-sectional side view of another illustrative laminated busbar assembly 900 having more than one shield, in accordance with some embodiments of the present disclosure. As illustrated, laminated busbar assembly 900 includes layers 901, 902, 903, 904, 905, 906, and 907. As illustrated, layers 901, 903, and 905 include dielectric insulation layers, layers 902 and 904 include current collectors (e.g., busbars defining a DC bus), and layers 906 and 907 include shields (e.g., steel layers). Layers 902 and 904, for example, may each include copper busbars (or any other suitable material), that define a DC bus of a battery system (e.g., for an electric vehicle). Layers 906 and 907 are electrically insulated from layers 902 and 904 by layer 905, and provide shielding against events associated with battery cells (e.g., arranged below layers 906 and 907, as illustrated). A shield layer may include a single layer, a non-continuous layer, one or more shields arranged between the rest of the busbar assembly and a battery module or a plurality of battery cells thereof. For example, a busbar assembly may include shielding along one or more portions to shield from particular battery cells (e.g., the shielding may correspond to individual battery modules and the illustrated gap between layers 906 and 907 may be positioned above a gap between two adjacent battery modules arranged below the layers).

In an illustrative example, referencing FIGS. 6-9, electrically insulating layers may include any suitable electrically insulating material(s) such as rubber, plastic, a powder coating, heat shrink, sensors, any other suitable dielectric material, or any combination thereof. In an illustrative example, referencing FIGS. 6-9, electrically conductive layers (e.g., that may be electrically coupled to a multitude of electrical components) may include metals, metallic materials (e.g., alloys, mixtures, solid solutions), plates, sheets, sensors, wires, insulating components in addition to electrically conductive components, any other suitable components, or any combination thereof. To illustrate, in the context of an electric car, a busbar in any electrically conductive layer of FIGS. 6-9 may be electrically coupled to a switched 300 V power line associated with a vehicle accessory component, such as an air conditioning compressor. A busbar in any electrically conductive layer of FIGS. 6-9 may be electrically coupled to an unswitched terminal of a battery. For example, a portion of a busbar may be physically coupled to the terminal of the battery using any suitable physical and electrical coupling method.

In a further example, a laminated busbar assembly may include at least one busbar (e.g., made of copper, aluminum, or other electrically conductive material) configured to be electrically coupled to a plurality of battery cells, at least one insulative layer arranged adjacent to the at least one busbar, wherein the at least one insulative layer is dielectric, and a steel layer (e.g., which may be electrically grounded) arranged adjacent to the at least one insulative layer and arranged between the at least one busbar and the plurality of battery cells. The steel layer may be configured to shield the at least one busbar from a thermal event associated with one or more battery cells of the plurality of battery cells. A portion of the steel layer of the laminated busbar assembly may be separated from the at least one insulative layer by an airgap. One or more standoffs (e.g., made of a dielectric material) may extend through the airgap. To illustrate, the at least one busbar may include a first busbar and a second busbar, and the at least one insulative layer may include: a first insulative layer arranged on a first side of the first busbar; a second insulative layer arranged on a second side of the first busbar opposite the first side and between the first busbar and a first side of the second busbar; and a third insulative layer arranged on a second side of the second busbar opposite the first side. The steel layer may be arranged adjacent to the third insulative layer. Such a configuration may include busbars insulated from one another and other components such as the steel layer.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. An apparatus, comprising:
an interface arranged adjacent a busbar and located between the busbar and a plurality of battery cells, wherein the interface comprises a dielectric and thermally insulating material.

2. The apparatus of claim 1, wherein the interface is structurally rigid.

3. The apparatus of claim 1, wherein the interface is positioned on a bottom side of the busbar.

4. The apparatus of claim 1, wherein:
the interface is a first interface; and
the apparatus further comprises a second interface spaced from the first interface.

5. The apparatus of claim 4, wherein the busbar comprises one or more current collectors layered between the first interface and the second interface.

6. The apparatus of claim 5, wherein the one or more current collectors comprise a plurality of current collectors, wherein the apparatus comprises a third interface between the plurality of current collectors.

7. The apparatus of claim 4, wherein an airgap is defined between the first interface and the second interface.

8. The apparatus of claim 1, further comprising a metal layer arranged between the interface and the plurality of battery cells.

9. The apparatus of claim 8, wherein the metal layer is a shield layer.

10. The apparatus of claim 8, wherein the metal layer includes a steel material.

11. An apparatus, comprising:
a busbar electrically coupled to a plurality of battery cells; and
an insulating material arranged adjacent the busbar, wherein the insulating material extends the length of the busbar.

12. The apparatus of claim 11, wherein the insulating material is structurally rigid.

13. The apparatus of claim 11, wherein the insulating material includes one of a polyimide (PI) material or a polyethylene terephthalate (PET) material.

14. The apparatus of claim 11, wherein the insulating material is positioned between the busbar and the plurality of battery cells.

15. The apparatus of claim 11, wherein the insulating material includes a first insulative layer and a second insulative layer spaced from the first insulative layer.

16. The apparatus of claim 15, wherein the first insulative layer and the second insulative layer are bonded to form a stack of layers.

17. The apparatus of claim 15, wherein the one or more current collectors comprise a plurality of current collectors, wherein the apparatus comprises a third insulative layer layered between the plurality of current collectors.

18. The apparatus of claim 15, wherein an airgap is defined between the first insulative layer and the second insulative layer.

19. The apparatus of claim 11, further comprising a metal layer arranged between the busbar and the plurality of battery cells.

20. The apparatus of claim 1, wherein the interface extends the length of the busbar.

* * * * *